(12) United States Patent
Martin et al.

(10) Patent No.: US 9,372,131 B2
(45) Date of Patent: Jun. 21, 2016

(54) PRESSURE SCANNER ASSEMBLIES HAVING REPLACEABLE SENSOR PLATES

(75) Inventors: Richard Martin, Ridgewood, NJ (US);
Lou DeRosa, Wayne, NJ (US); Joseph VanDeWeert, Maywood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 378 days.

(21) Appl. No.: 13/184,613

(22) Filed: Jul. 18, 2011

(65) Prior Publication Data
US 2012/0016603 A1    Jan. 19, 2012

Related U.S. Application Data

(60) Provisional application No. 61/365,231, filed on Jul. 16, 2010.

(51) Int. Cl.
*G06F 19/00* (2011.01)
*G01L 15/00* (2006.01)

(52) U.S. Cl.
CPC ..................................... *G01L 15/00* (2013.01)

(58) Field of Classification Search
CPC ........... G01L 1/00; G01L 13/00; G01L 15/00;
G01L 25/00; G01L 27/00; G01L 2019/0053;
G01L 7/00; G01L 19/04; G01L 9/06; G01L
9/04; G01M 1/00; G01C 25/00; G06F 19/00;
G01D 21/02; G01R 27/28
USPC .............................................. 702/50, 100, 138
See application file for complete search history.

(56) References Cited

U.S. PATENT DOCUMENTS 3,930,412 A  *  1/1976  Mallon et al. ................... 73/721
4,111,058 A  *  9/1978  Gross .............................. 73/714
4,442,716 A  *  4/1984  Coe et al. ........................ 73/756

(Continued)

FOREIGN PATENT DOCUMENTS

GB          2411960          9/2005
JP     2007-204006 A          8/2007

OTHER PUBLICATIONS

International Search Report and Written Opinion dated Oct. 26, 2012 issued by the European Patent Office for related PCT Patent Application No. PCT/US2011/044066.

(Continued)

*Primary Examiner* — Gregory J Toatley
*Assistant Examiner* — Ruihua Zhang
(74) *Attorney, Agent, or Firm* — Troutman Sanders LLP; James E. Schutz; Christopher C. Close, Jr.

(57) ABSTRACT

A pressure scanner assembly having at least one replaceable sensor plate, wherein each of the replaceable sensor plates has at least one pressure sensor adapted to transmit a signal substantially indicative of a sensed pressure condition. A memory chip, which stores correction coefficients for each of the pressure sensor to compensate for thermal errors, may be installed on each of the replaceable sensor plates. The signals from the pressure sensors are multiplexed and may be outputted in analog or digital form. The pressure scanner assemblies described herein have sensor plates that can be interchanged with other sensor plates of the same or different pressure range without disrupting the electronic configuration of the pressure scanner assembly or having to recalibrate and/or update the memory chip installed thereon.

18 Claims, 3 Drawing Sheets

(56) References Cited

U.S. PATENT DOCUMENTS

| | | | | |
|---|---|---|---|---|
| 4,483,178 A | * | 11/1984 | Miille | 73/708 |
| 4,598,381 A | * | 7/1986 | Cucci | 702/138 |
| 4,753,105 A | * | 6/1988 | Juanarena et al. | 73/1.62 |
| 5,070,732 A | * | 12/1991 | Duncan et al. | 73/431 |
| 5,406,036 A | * | 4/1995 | Haug | 177/25.15 |
| 5,790,422 A | * | 8/1998 | Power et al. | 73/304 R |
| 6,035,240 A | | 3/2000 | Moorehead et al. | |
| 6,139,361 A | * | 10/2000 | Przilas et al. | 439/559 |
| 6,247,369 B1 | * | 6/2001 | Chapman et al. | 73/726 |
| 8,061,213 B2 | * | 11/2011 | Kurtz et al. | 73/721 |
| 2004/0230352 A1 | * | 11/2004 | Monroe | 701/3 |
| 2006/0001761 A1 | * | 1/2006 | Haba et al. | 348/340 |
| 2006/0177956 A1 | * | 8/2006 | O'Brien et al. | 438/50 |
| 2006/0272383 A1 | * | 12/2006 | Huang et al. | 73/1.15 |
| 2007/0180901 A1 | * | 8/2007 | Katou et al. | 73/146.2 |
| 2007/0235231 A1 | | 10/2007 | Loomis et al. | |
| 2008/0107151 A1 | * | 5/2008 | Khadkikar et al. | 374/141 |
| 2009/0116167 A1 | * | 5/2009 | Stevenson et al. | 361/306.1 |
| 2009/0288484 A1 | * | 11/2009 | Selvan et al. | 73/335.02 |
| 2010/0185403 A1 | * | 7/2010 | Kurtz et al. | 702/53 |

OTHER PUBLICATIONS

JP2013-519838 Notice of Refusal, Mailed Feb. 24, 2015.

\* cited by examiner

PRESSURE SCANNER ASSEMBLIES HAVING REPLACEABLE SENSOR PLATES

CROSS-REFERENCE TO RELATED APPLICATIONS

This application claims priority under 35 U.S.C. §119(e) to U.S. Provisional Patent Application No. 61/365,231, filed on Jul. 16, 2010, which is hereby incorporated by reference in its entirety as if fully set forth herein.

BACKGROUND

Pressure scanner assemblies are high accuracy, low-cost devices that incorporate and combine many pressure sensors (e.g., 8, 16, 32, 64, etc.) having wide pressure ranges into one small box. More specifically, the pressure sensors are housed in various sensor plates that correspondingly fit within the small box of the pressure scanner assembly. Each pressure sensor is configured to measure pressure of an applied pressure source and subsequently produce an output indicative of that pressure. This output is then transmitted via an electrical connector to a data logging system. This output can be in analog or digital form.

The data from the pressure scanner assembly must then be correlated to actual pressure readings. The gain and offset for each sensor must be used to convert from raw voltage to a pressure reading. In most pressure scanner assemblies, the output data must also be corrected to compensate for thermal errors. This is typically done by manually entering correlation and correction coefficients into a data acquisition system, which can be time consuming. Alternatively, a memory chip storing correction coefficients can be embedded into the pressure scanner assembly, however the memory chip must be updated and/or recalibrated each time a pressure sensor malfunctions and is replaced.

In many embodiments, the sensor plates are built into the pressure scanner assembly and thus, cannot be easily replaced by the user. Instead, the user must send the pressure scanner assembly back to the manufacturer to replace the necessary sensor plates or individual sensors, which can be time consuming and costly. In other embodiments, pressure sensors are attached to a removable sensor plate so that, if needed, a sensor plate having working pressure sensors can replace a sensor plate with damaged pressure sensors. These embodiments, however, require that the replacement pressure sensors are of the same pressure range and/or have similar correction coefficients. Therefore, if a sensor plate configured to operate under different pressure parameters is used as the replacement sensor plate, it will adversely interfere with the electronics of the overall pressure scanner assembly.

Because of these limitations, there is a need for a pressure scanner that has replaceable sensor plates, wherein the sensor plates can be interchanged with other sensor plates of the same or different pressure ranges without disrupting the electronic configuration of the pressure scanner assembly or having to recalibrate and/or update the memory chip installed thereon.

BRIEF SUMMARY

The various embodiments of the present invention provide pressure scanner assemblies that comprise at least one replaceable sensor plate, wherein each of the replaceable sensor plates has at least one pressure sensor that transmits a signal substantially indicative of a sensed pressure condition. The pressure scanner assemblies further comprise a memory chip installed on each of the replaceable sensor plates, wherein the memory chip stores correction coefficients for each of the pressure sensors on the corresponding replaceable sensor plate.

In some embodiments, the pressure scanner assemblies may further comprise at least one multiplexer installed on each of the replaceable sensor plates, wherein each of the multiplexers are configured to receive the signals indicative of the sensed pressure condition from each of the pressure sensors on the corresponding replaceable sensor plate and transmit a final output.

Further, some embodiments include at least one multiplexing line in electrical communication with each of the multiplexers, wherein each of the multiplexing lines are configured to select signals and correction coefficients to be transmitted in the final output, wherein the final output may be in analog or digital form.

More specifically, analog pressure scanner assembly embodiments may comprise at least one replaceable sensor plate, wherein each of the replaceable sensor plates has at least one pressure sensor that transmits a signal substantially indicative of a sensed pressure condition; a memory chip installed on each of the replaceable sensor plates, wherein the memory chip stores correction coefficients for each of the pressure sensors on the corresponding replaceable sensor plate; and at least one multiplexer installed on each of the replaceable sensor plates configured to receive the signals from each of the pressure sensors on the corresponding replaceable sensor plate and transmit a final analog output.

The analog pressure scanner assembly may further comprise at least one multiplexing line in electrical communication with each of the multiplexers, wherein each of the multiplexing lines are configured to select signals and correction coefficients to be transmitted in the final output.

Even further, digital pressure scanner assembly embodiments may comprise at least one replaceable sensor plate, wherein each of the replaceable sensor plates has at least one pressure sensor that transmits an analog signal substantially indicative of a sensed pressure condition; a memory chip installed on each of the replaceable sensor plates, wherein the memory chip stores correction coefficients for each of the pressure sensors on the corresponding replaceable sensor plate; at least one multiplexer installed on each of the replaceable sensor plates configured to receive the analog signals from each of the pressure sensors; and at least one analog to digital converter installed on each of the replaceable sensor plates, wherein the analog to digital converter is in electrical communication with the multiplexer on the corresponding replaceable sensor plate and converts the analog signals into digital signals.

In this embodiment, each analog to digital converter controls the multiplexer on the corresponding replaceable sensor plate and selects the digital signals and correction coefficients to be transmitted in a final digital output. Some digital pressure scanner assembly embodiments may further comprise a central microprocessor adapted to receive the final digital output from each analog to digital converter.

DETAILED DESCRIPTION

Figure 1:
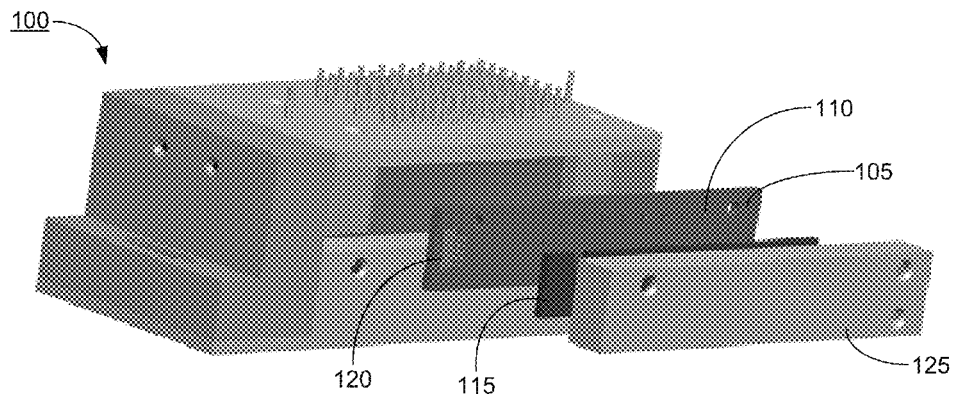
FIG. 1 illustrates an embodiment of a pressure scanner assembly in accordance with exemplary embodiments of the present invention.

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Referring now to the drawings, in which like numerals represent like elements, exemplary embodiments of the present invention are herein described. It is to be understood that the figures and descriptions of the present invention have been simplified to illustrate elements that are relevant for a clear understanding of the present invention, while eliminating, for purposes of clarity, many other elements found in typical pressure scanner assembly and methods of making and using the same. Those of ordinary skill in the art will recognize that other elements are desirable and/or required in order to implement the present invention. However, because such elements are well known in the art, and because they do not facilitate a better understanding of the present invention, a discussion of such elements is not provided herein.

Exemplary embodiments of the present invention provide pressure scanner assemblies that comprise at least one replaceable sensor plate. Each sensor plate comprises at least one pressure sensor that measures an applied pressure and transmits an output signal substantially indicative of the applied pressure. The pressure scanner assembly may further comprise a memory chip installed on each of the replaceable sensor plates, wherein the memory chip stores correction coefficients for each of the pressure sensors on the corresponding sensor plate.

An exemplary embodiment of a pressure scanner assembly 100 is illustrated in FIG. 1. The pressure scanner assembly 100 comprises at least one sensor plate 105. One skilled in the art will appreciate that the pressure scanner assembly may comprise more than one sensor plate 105, for example but not limited to, two or four sensor plates.

The sensor plates 105 are configured to fit within the main body of the pressure scanner assembly 100 and may be easily removed and replaced by a user, therefore allowing the user to easily swap sensor plates 105 to manipulate the pressure sensing range and/or replace a damaged sensor plate 105 (or one that requires routine maintenance) with a sensor plate that works properly. This configuration provides great benefits to a user as the user can quickly replace one or more sensor plates 105 and continue use of the pressure scanner assembly 100 without incurring substantial costs or long periods of downtime. The sensor plates 105 can be made of many materials and can be of many dimensions, for example but not limited to, about 0.5 inches by 2.5 inches.

Each sensor plate 105 comprises at least one pressure sensor 110. One skilled in the art, however, will appreciate that each sensor plate 105 may have more than one pressure sensor 110, for example but not limited to, eight sensors or sixteen sensors. The pressure sensors 110 measure an applied pressure and output a signal substantially indicative of the applied pressure. The pressure sensors 110 can be, for example but not limited to, piezoresistive pressure sensors. The pressure sensors 110 may be configured to measure the same pressure range; contrastingly, the pressure sensors 110 may be configured to measure different pressure ranges. This broad pressure range capacity enables the pressure scanner assembly 100 to scan and switch between multiple pressure ranges, which increases the throughput and productivity of the pressure scanner assembly 100.

As illustrated in FIG. 1, each sensor 110 may be connected to an electronics board 115. The electronics board 115 may comprise various electronic devices, for example but not limited to, multiplexers, memory chips, and/or analog to digital converters, as required by the embodiments, which are further described herein. The pressure scanner assembly 100 may also comprise a cover 125 configured to seal the pressure sensors 110, and the electronics board 115 into a closed cavity created between the cover and the sensor plate. In this way, the top of the sensor plate 105 remains sealed from external environments, therefore allowing the reference pressure to be applied to and accurately measured by the pressure sensors 110. Further the electronics board 115 connects to the main body of the pressure scanner assembly 100 via a hermetic connector. This connector allows the electrical signals to pass out while maintaining the sealed cavity.

Figure 2:
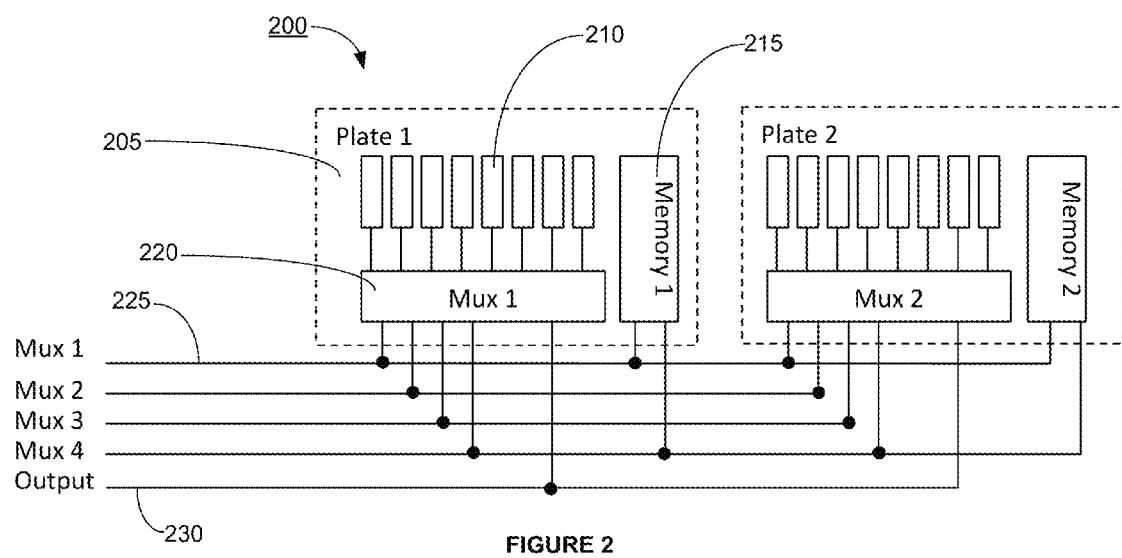
FIG. 2 illustrates an embodiment of an analog pressure scanner assembly in accordance with exemplary embodiments of the present invention.

The pressure scanner assembly 100 of the present invention may be configured to output in analog or digital form. FIG. 2 provides an illustration of an analog pressure scanner assembly 200 in accordance with exemplary embodiments of the present invention. The analog pressure scanner assembly 200 comprises at least one sensor plate 205. As described above, each sensor plate 205 may comprise a plurality of pressure sensors 210, wherein the pressure sensors 210 are configured to measure an applied pressure and output a signal substantially proportional to the applied pressure. The sensor plates 200 are replaceable and may be replaced with sensor plates of the same or different pressure ranges. The analog pressure scanner assembly 200 further comprises a memory chip 215 installed on each sensor plate 205. The memory chip 215 comprises coefficients for each pressure sensor 210 on the corresponding sensor plate 205 to correct for thermal errors and other errors commonly associated with each individual pressure sensor 210, and further correlates the pressure signals to actual pressure readings. Therefore, because each sensor plate 205 has a memory chip 215 unique to each individual pressure sensor 210 installed on the corresponding sensor plate 205, the sensor plates 205 may be easily swapped and replaced without having to recalibrate the analog pressure scanner assembly 200 or manually update the memory chip 215.

The analog pressure scanner assembly 200 further comprises at least one multiplexer 220 installed on each of the sensor plates 205 and at least one multiplexing line 225 in electrical communication with each multiplexer. It shall be understood that each sensor plate 205 may comprise a plurality of multiplexers 220 and further, the analog pressure scanner assembly 200 may comprises a plurality of multiplexing lines 225. The multiplexers 220 receive pressure signals from each of the pressure sensors 210 installed on the corresponding sensor plate 205. The multiplexing lines 225 electrically communicate with the multiplexers 220 installed on each of the sensor plates 205 and use binary addressing to select which of the pressure sensor signals will be outputted via an output line 230. In an exemplary embodiment, the output is an analog output. The multiplexing lines 225 also use binary addressing to select the appropriate memory chip 215 and correction coefficients that correspond to the selected pressure sensor signals. This communication may be done over one multiplexing line or, alternatively, multiple multiplexing lines. Further an analog amplifier may be situated after the multiplexers either on each individual sensor plate or on the main scanner assembly.

Figure 3:
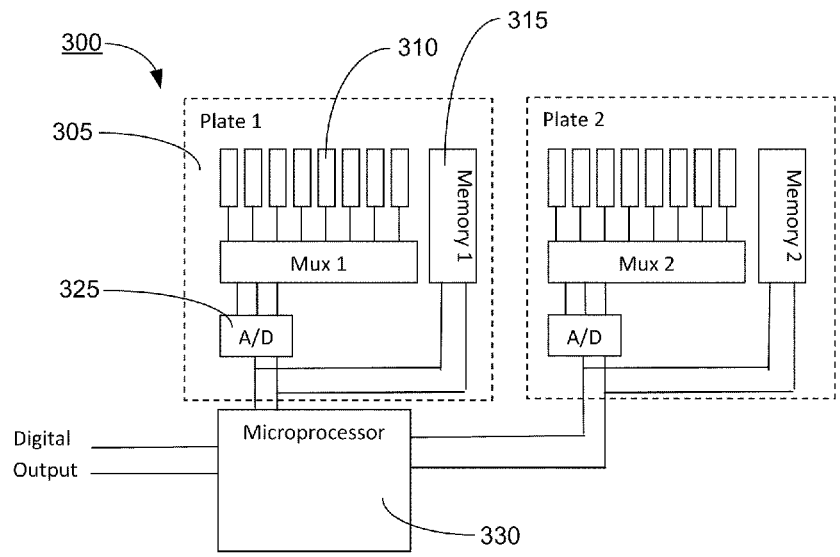
FIG. 3 illustrates an embodiment of a digital pressure scanner assembly in accordance with exemplary embodiments of the present invention.
Figure 4:
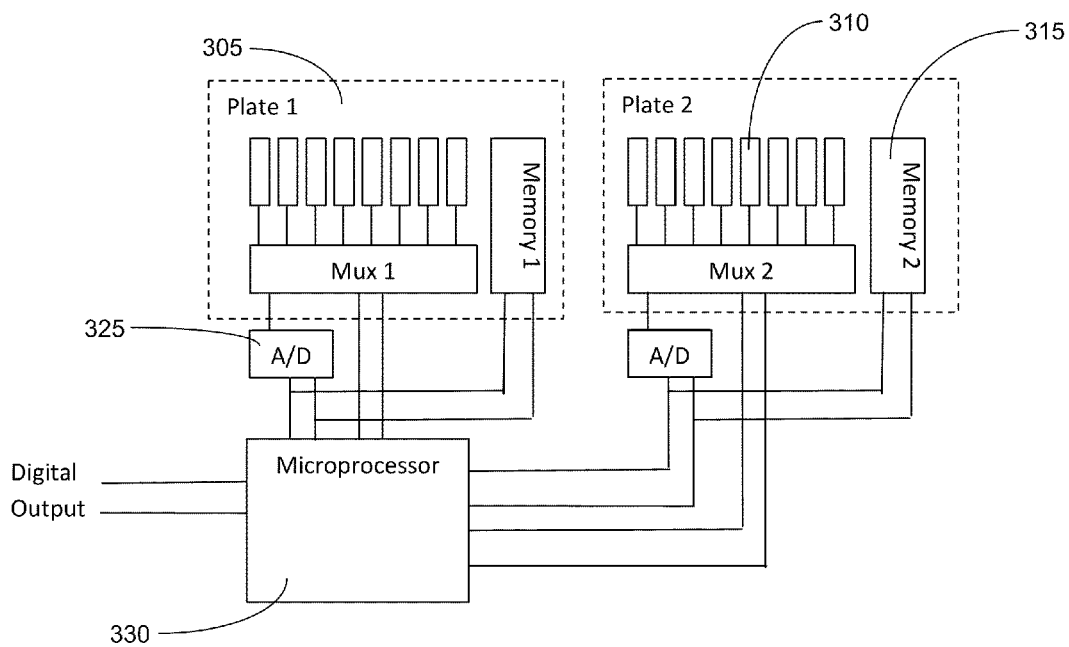
FIG. 4 illustrates exemplary embodiment of a digital pressure scanner assembly in accordance with exemplary embodiments of the present invention.

FIGS. 3 and 4 provide illustrations of digital pressure scanner assemblies 300 in accordance with exemplary embodiments of the present invention. Like the analog pressure scanner assembly 200, described above, the digital pressure scanner assembly 300 also comprises replaceable sensor plates 305, wherein each sensor plate 305 comprises pressure sensors 310, a memory chip 315, and a multiplexer 320. The digital pressure scanner assembly 300, however, further comprises an analog to digital converter (A/D) 325. In some embodiments, the A/D 325 may be installed on the sensor plate 305 to save space, as illustrated in FIG. 3. In other embodiments, the A/D 325 may be installed within the digital pressure scanner assembly 300 but independent from the sensor plate 305, as illustrated in FIG. 4, which reduces the cost and size of the sensor plates 305. In both embodiments, the A/D 325 controls the multiplexers 320 and, like the multiplexing lines 225 in the analog pressure scanner assembly 200, selects which pressure sensor signal will be outputted. The A/D 325 then converts the analog data from the selected pressure sensor signals into digital signals and passes the data to a central microprocessor 330 located within the body of the digital pressure scanner assembly 300. The microprocessor 330 then reads the memory chips 315 installed on each of the sensor plates 305 and uses the corresponding correction coefficients to interpret the digital data for each selected pressure sensor 310. The communication between the microprocessor 330 and the memory chip 315 may be carried out over the same digital lines as the A/D 325 or over separate lines. It is also understood that the microprocessor may control the multiplexer directly through separate output control lines.

It shall be understood that each sensor plate 305 may hold one or more A/Ds 325 depending on the number of pressure sensors 310 installed on the sensor plates 305 and the data rates needed. Having the A/Ds 325 installed on each of the sensor plates 305 allows the A/D 325 and the pressure sensors 315 to be in close proximity, which results in higher noise immunity. Further, it also eliminates analog signals from passing through mechanical connectors otherwise disposed between the A/D 325 and pressure sensors 310, which also results in higher noise immunity. The digital pressure scanner assembly 300 may further comprise an amplifier on each sensor plate 305 disposed between the multiplexer 320 and the A/D 325 to create higher level signals for the A/D 325 to measure.

As described, both analog pressure scanner assembly 200 embodiments and digital pressure scanner assembly 300 embodiments comprise memory chips 215/315 installed on the sensor plates 205/305. This configuration enables pressure sensors of many different pressure ranges to be easily added to the pressure scanner assembly without having to do extensive recalibrations or enter new data points. In this way, a single pressure scanner assembly, for example, may accurately measure 5 PSI differential, 15 PSI absolute, and 100 PSI absolute pressure ranges at the same time.

Figure 5:
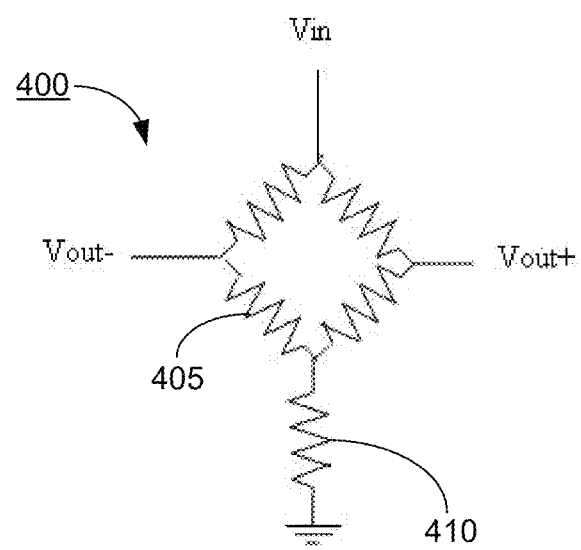
FIG. 5 illustrates an embodiment of a piezoresistive pressure sensor able to measure both temperature and applied pressure.

Another advantage of the present invention is that the unique configuration of multiplexers may allow for the measurement of the sensor temperature as well as the pressure using the same measurement system. As an example, FIG. 5 illustrates an embodiment of a piezoresistive pressure sensor 400 able to measure both temperature and applied pressure. In the case of the analog output scanner, the multiplexers can be configured to have a separate input that allows for measurements of each side of the piezoresistive bridge 405 rather than the difference between them. Those skilled in the art will appreciate that by averaging these two common mode measurements, a value of the resistance of the piezoresistive bridge can be calculated provided that there is a fixed span resistor 410 in series with the bridge 405. Since the resistance of the bridge is proportional to bridge temperature this value can be used to calculate the bridge temperature. In the same way in the digital output scanner the same A/Ds used to measure pressure can be used to measure temperature. This temperature data can then be used either with the internal microprocessor or an external system along with the correction coefficients stored in the memory to accurately calculate the pressure over the entire temperature range.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:
1. A system, comprising:
a first replaceable plate having disposed thereon:
a plurality of sensors configured to: receive an environmental condition; measure the environmental condi- tion within a first range to obtain a sensed condition signal; and output the sensed condition signal;
a multiplexer operationally coupled to the plurality of sensors, wherein the multiplexer is configured to: receive the sensed condition signal from each of the plurality of sensors; in response to receiving a first selection signal associated with one of the plurality of sensors, select the sensed condition signal from the one of the plurality of sensors; and
output the sensed condition signal from the selected one of the plurality of sensors;
a memory configured to: store a first set of correction coefficients for each of the plurality of sensors; and in response to receiving a second selection signal associated with selecting, from the first set of correction coefficients, a correction coefficient for the one of the plurality of sensors, output the selected correction coefficient of the one of the plurality of sensors to a remote processor outside the first replaceable plate; and
a connector maintaining a sealed cavity at the first replaceable plate, the connector operationally coupled to the multiplexor and directly coupled to the memory, wherein the connector is configured to communicate, with the remote processor outside the first replaceable plate, the first selection signal, the second selection signal, the sensed condition signal from the one of the plurality of sensors disposed on the first replaceable plate, and the correction coefficient, from the first set of correction coefficients, of the one of the plurality of sensors; and
a second replaceable plate having disposed thereon:
a plurality of sensors configured to: receive an environmental condition; measure the environmental condition within a second range to obtain a sensed condition signal; and output the sensed condition signal;
a multiplexer operationally coupled to the plurality of sensors, wherein the multiplexer is configured to: receive the sensed condition signal from each of the plurality of sensors; in response to receiving a third selection signal associated with one of the plurality of sensors, select the sensed condition signal from the one of the plurality of sensors; and output the sensed condition signal from the selected one of the plurality of sensors;
a memory configured to: store a second set of correction coefficients for each of the plurality of sensors; and in response to receiving a fourth selection signal associated with selecting, from the second set of correction coefficients, a correction coefficient for the one of the plurality of sensors, output the selected correction coefficient of the one of the plurality of sensors to the remote processor outside the second replaceable plate; and
a connector maintaining a sealed cavity at the second replaceable plate, the connector operationally coupled to the multiplexor and directly coupled to the memory, wherein the connector is configured to communicate, with the remote processor outside the second replaceable plate, the third selection signal, the fourth selection signal, the sensed condition signal from the one of the plurality of sensors disposed on the second replaceable plate, and the correction coefficient, from the second set of correction coefficients, of the one of the plurality of sensors.

2. The system of claim 1, wherein the connector disposed on the first replaceable plate or the second replaceable plate is hermetically sealed.

3. The system of claim 1, further comprising:
an amplifier disposed on the first replaceable plate and operationally coupled to the multiplexer, wherein the amplifier is configured to: receive, from the multiplexer, the sensed condition signal from the one of the plurality of sensors disposed on the first replaceable plate; scale the sensed condition signal from the one of the plurality of sensors disposed on the first replaceable plate to obtain a scaled signal; and output the scaled signal.

4. The system of claim 1, further comprising:
an analog-to-digital converter disposed on the first replaceable plate and operationally coupled to the multiplexer, wherein the analog-to-digital converter is configured to: receive the sensed condition signal from the one of the plurality of sensors disposed on the first replaceable plate; convert the sensed condition signal from the one of the plurality of sensors to a converted signal; and output the converted signal.

5. The system of claim 4, further comprising:
an amplifier disposed on the first replaceable plate and operationally coupled to the multiplexer and the analog-to-digital converter, wherein the amplifier is configured: receive, from the multiplexer, the sensed condition signal from the one of the plurality of sensors disposed on the first replaceable plate; scale the sensed condition signal from the one of the plurality of sensors to obtain a scaled signal; and output, to the analog-to-digital converter, the scaled signal.

6. The system of claim 4, wherein the multiplexor and the analog-to-digital converter are combined into a single unit.

7. The system of claim 4, wherein each of the converted signal, the first selection signal, the second selection signal, and the correction coefficient, from the first set of correction coefficients, of the one of the plurality of sensors is a digital signal.

8. The system of claim 1, wherein the first selection signal is associated with the second selection signal.

9. The system of claim 1, wherein at least one of the plurality of sensors disposed on the second replaceable plate is further configured to:
in response to receiving a fifth selection signal associated with selecting one of a plurality of environmental conditions, select the one of the plurality of environmental conditions to be measured by the at least one of the plurality of sensors disposed on the second replaceable plate.

10. The system of claim 9, further comprising:
a selection line disposed on the second replaceable plate and operationally coupled to at least one of the plurality of sensors disposed on the second replaceable plate, wherein the selection line is configured to select the one of the plurality of environmental conditions to be measured by the at least one of the plurality of sensors disposed on the second replaceable plate.

11. The system of claim 9, wherein the plurality of environmental conditions includes pressure and temperature.

12. The system of claim 1, further comprising:
a selection line disposed on the first replaceable plate and operationally coupled to the multiplexer disposed on the first replaceable plate, wherein the first selection line is configured to communicate the first selection signal to the multiplexer disposed on the first replaceable plate.

13. The system of claim 12, wherein the selection line disposed on the first replaceable plate is also operationally coupled to the memory disposed on the first replaceable plate, wherein the selection line is further configured to communicate the second selection signal to the memory disposed on the first replaceable plate.

14. The system of claim 1, wherein the selection line disposed on the first replaceable plate is a first selection line, further comprising:
   a second selection line disposed on the first replaceable plate and operationally coupled to the memory disposed on the first replaceable plate, wherein the second selection line is further configured to communicate the second selection signal to the memory disposed on the first replaceable plate.

15. The system of claim 1, further comprising:
   a cover, wherein the cover and the first replaceable plate or the second replaceable plate define a hermetically sealed cavity.

16. The system of claim 1, wherein the environmental condition is pressure.

17. The system of claim 1, wherein the environmental condition is temperature.

18. The system of claim 1, wherein the a plurality of sensors disposed on the first replaceable plate comprise one or more piezoresistive sensors.

* * * * *